United States Patent [19]
Kamil

[11] Patent Number: 6,038,548
[45] Date of Patent: Mar. 14, 2000

[54] SYSTEM AND METHOD FOR CONDUCTING ELECTRONIC COMMERCE IN A COMPUTER NETWORK USING A CASHIER DESK PAYMENT FRAMEWORK

[75] Inventor: Julian I. Kamil, Herndon, Va.

[73] Assignee: International Business Machines Corporation, Armonk, N.Y.

[21] Appl. No.: 08/979,245

[22] Filed: Nov. 26, 1997

[51] Int. Cl.7 .................................................. G06F 17/60
[52] U.S. Cl. ............................................................ 705/35
[58] Field of Search ................................ 705/35, 39, 44, 705/16, 26, 17, 19, 20, 21, 23, 24, 30, 400; 709/200, 201, 203, 208, 217, 219, 202; 707/501, 513; 395/683

[56] References Cited

U.S. PATENT DOCUMENTS

| | | | |
|---|---|---|---|
| 5,221,838 | 6/1993 | Gutman et al. ........................ | 235/379 |
| 5,283,829 | 2/1994 | Anderson .................................. | 380/24 |
| 5,591,949 | 1/1997 | BerNstein ............................... | 235/380 |
| 5,671,297 | 9/1997 | Elgamal .................................... | 380/23 |
| 5,701,484 | 12/1997 | Artsy ....................................... | 395/683 |
| 5,710,887 | 1/1998 | Chelliah et al. ......................... | 705/26 |
| 5,850,446 | 12/1998 | Berger et al. ............................ | 380/24 |
| 5,897,622 | 4/1999 | Blinn et al. .............................. | 705/26 |

*Primary Examiner*—Emanuel Todd Voeltz
*Assistant Examiner*—Thomas A. Dixon
*Attorney, Agent, or Firm*—Morgan & Finnegan, LLP; Joseph C. Redmond, Jr.

[57] ABSTRACT

In a computer network, a system and method that provides electronic commerce services using replaceable and extensible, object-oriented software components, in one form, implemented in the Java programming language. The communication network includes a plurality of user workstations coupled to a network server containing a collection of replaceable and extensible object-oriented software components in a framework that accepts payment requests from users; processes payment requests and performs other transactions using the services of a Cashier component; CashierDesk component; Register component; a TaxCalculator component; a Ledger component for temporarily storing payment transactions; and a Safe for permanently storing transactions. Each component is either an abstract class or an interface, allowing a merchant to vary the implementation of one or more components without affecting the operation of the remaining components of the system in processing transactions. The transactions may be accomplished in a secure environment using a digital container.

34 Claims, 3 Drawing Sheets

The Cashier Framework

A Computer Network

FIG. 1A

A Network Server

FIG. 1B

A Workstation

The Cashier Framework

FIG. 3

Interaction Diagram of the Processing of a Payment Request

SYSTEM AND METHOD FOR CONDUCTING ELECTRONIC COMMERCE IN A COMPUTER NETWORK USING A CASHIER DESK PAYMENT FRAMEWORK

BACKGROUND OF THE INVENTION

1. Field of the Invention

This invention relates to computer networks. More specifically, the invention relates to systems and methods for providing improved background services for conducting electronic commerce in computer networks.

2. Background Information

Merchants who wish to conduct business with their customers electronically are presented with a myriad of new and existing technologies that will enable and support effective electronic commerce. Conducting commerce electronically is similar to the way in which a merchant and a customer traditionally interact with each other when executing a standard business transaction (i.e., a sale of a service, a return of a product, etc.). However, unlike the traditional way of executing a business transaction, with electronic commerce, there is no direct person-to-person interaction.

Electronic commerce is conducted over a computer network, such as the Internet, which connects a merchant with many potential customers, and connects each potential customer with several merchants. In order to execute transactions electronically, both the merchant and the customer need to perform their respective functions using various software components that will allow them to electronically mimic their conventional roles in the transaction process. For example, the functions that need to be performed by the customer include selecting a merchant storefront, selecting products, and providing payment for the selected products. The functions that need to be performed by the merchant include tallying the selected products, calculating a total cost for said products (including appropriate taxes as necessary), securing customer payment, delivering the product, issuing a receipt to the customer, and recording an account of the transaction.

When conducting electronic commerce, the merchant will rely on software components to provide the necessary background services that will handle the merchandising and collection of payment for the products and services offered for sale through computer networks such as the Internet. A background service is a continuous unattended (automated) service that is provided by one or more machines or software components. Currently, there are a great number of payment instruments (credit cards, electronic cash, electronic check, etc.), and competing front-end (running at the end user's machine or workstation) and back-end (running at the merchant's machine or server) software components (electronic wallets, electronic cash registers, etc.) that can record and supply payment information and collect customer payments. These payment instruments, together with communication protocols and standards need to be supported in order to conduct effective electronic commerce.

Creating a specific electronic commerce solution that supports a variety of payment instruments, standards, and protocols, using a specific set of software components is a complex job. Furthermore, when a custom solution is created using a particular set of software components, the resulting solution tends to be heavily dependent on the components that have been utilized to create it. If one of the components needs to be changed, due to the availability of a newer technology or the changing needs of the merchant, the solution will require a revision, which often means a costly and time-consuming interruption for the merchant.

To avoid the creation of an inflexible and monolithic solution, what is needed is a software framework that will provide an extensible way to dynamically integrate the necessary background services. Using such a framework, a specific solution can be created that can be easily extended to support future electronic commerce standards and technologies, while also meeting the constantly changing needs of a merchant.

In addition, the framework should allow the creation of a solution that uses software components matching the current best-of-breed marketplace offerings. Therefore, a merchant could take advantage of both customized and commercially available software components in creating an optimal solution for his background services. As a result, flexible background services can be made available to a merchant in a relatively easy and fast manner.

3. Description of Prior Art

Prior art related to electronic commerce and merchandise is as follows:

U.S. Pat. No. 5,221,838 issued Jun. 22, 1993, discloses an electronic wallet including memory for storing at least a balance corresponding to an account in a financial institution and a selective call receiver for receiving a wireless message transmitted from a remote transmitter, the wireless message including financial information relating to the balance for confirming a financial transaction with the financial institution. A controller, coupled to the memory and the receiver, can update the balance in the memory in response to the wireless message, which enters financial transactions into the communications system for multiple plurality of associated portable data devices. The wallet updates the financial transactions from the communications system to the one and at least a second of a plurality of associated portable data devices by a wireless message communication from at least one remote transmitter.

U.S. Pat. No. 5,283,829 issued Feb. 1, 1994, discloses an electronic bill payment system and method including billing equipment for creating approval records and generating approval numbers for each pre-authorized subscriber. The system also includes an interactive payment approval apparatus into which subscribers dial to approve payment and which determines, based upon information collected, whether to initiate electronic funds transfer. An approval record database and a call history log database are also part of the bill payment system. To approve electronic bill payment a subscriber, once pre-authorized, need only dial up the payment approval apparatus and enter the assigned approval number. A series of security checks and comparisons are performed to guard against accidental and malicious entry of approval numbers. Once all security checks are cleared, a confirmation number is announced to the subscriber, and an electronic funds transfer is initiated.

U.S. Pat. No. 5,591,949 issued Jan. 7, 1997, and filed Jan. 6, 1995, discloses an automatic account controller for remotely arranging for payment of debt to a vendor. The controller includes a detector for activating the portable account controller upon detection of an indicia of identity of an authorized user and a selector for selecting a mode of payment to the vendor. The controller further includes a keypad for entering a payment amount, a wireless transceiver for communicating with the vendor, and a processor for executing a selected mode of payment to the vendor through the apparatus for communicating.

None of the prior art discloses or suggests a general framework for integrating replaceable object-oriented software components to create specific solutions for background services according to a merchant's changing needs in electronic commerce conducted in computer networks.

SUMMARY OF THE INVENTION

An object of the invention is a system and method for providing improved background services for electronic commerce in a computer data network.

Another object is a system and method for providing background services in electronic commerce in a computer data network using replaceable electronic components.

Another object is a system and method for simplifying the integration of replaceable software components in providing background services for electronic commerce in a computer data network.

Another object is a system and method for providing electronic commerce in a computer data network using object-oriented replaceable software components.

Another object is a framework of replaceable software components in object-oriented technology providing background services in electronic commerce conducted in a computer data network.

These and other objects, features and advantages are achieved in a system and method that provides electronic commerce services in a computer network, using replaceable and extensible, object-oriented software components implemented in an interpretive translation programming language. The communication network includes a plurality of user workstations coupled to a network server containing a collection of replaceable and extensible object-oriented software components in a framework. termed Cashier, that accepts payment requests from users; processes payment requests using the services of a Register component; a TaxCalculator component; a Ledger or Journal component for temporarily storing payment transactions; and a Safe for permanently storing transactions. Each component is either an abstract class or an interface, allowing a merchant to vary the implementation of one or more components without affecting the operation of the remaining of the system.

DESCRIPTION OF DRAWINGS

The invention will be further understood from the following detailed description of a preferred embodiment, taken in conjunction with the appended drawings, in which.

DESCRIPTION OF PREFERRED EMBODIMENT

1. Invention Overview:

Before describing the present invention a brief overview is believed helpful in understanding the scope of the invention. The system and method of the present invention conduct electronic commerce effectively using a framework comprised of replaceable and extensible software components that are able to perform the same functions as required by a traditional Cashier in a merchant environment. The Cashier Framework is a collection of classes, interfaces, and objects, written in a an interpretive translation programming language, e.g. JAVA™ that provides a way to integrate the software components and background services needed to enable electronic commerce in a computer network. The Cashier Framework applies object-oriented and component technologies in providing a flexible and extensible environment that allows merchants to derive or create optimal solutions that meet their changing needs using both commercially available and custom developed software components. The Cashier Framework simplifies the job of creating an electronic commerce solution by providing a merchant with a collection of software components that can be customized further as necessary. Instead of starting from scratch, a merchant could use the framework as a template from which a custom solution can be created by customizing or replacing the appropriate software components. Through the use of the framework, various technologies and features could be integrated into an optimal, flexible, and extensible solution in a relatively simple manner.

Due to the flexibility and extensibility that is inherent in the design of the Cashier Framework, a merchant using this framework would be prevented from creating an inflexible and monolithic solution. By extending or replacing components, new standards and technologies can be easily incorporated into a solution based on the framework, preventing it from becoming obsolete or dependent on proprietary components.

The components of the Cashier Framework and a working instance of the framework are provided as objects, classes (concrete and abstract), and interfaces that are written in the Java programming language. The Java programming language has been chosen to implement the Cashier Framework because of its strong object-oriented nature, high level of portability, and ease of use. It must be noted, however, that the Cashier Framework can be implemented using other object-oriented or procedural programming languages as well. A description of the Java programming language follows to aid in a better understanding of the invention.

2. The Java Programming Language:

The Java programming language, a product of Sun Microsystems (Mountain View, Calif.), is well described in literatures such as the text "Core Java" by G. Cornell et. al. (SunSoft Press, Mountain View, Calif., 1996, ISBN 0-13-565755-5), which is partially incorporated herein by reference.

Java, like any object-oriented programming language, defines the notions of objects, classes, concrete or abstract, and interfaces.

Java objects are instances of concrete classes. Each class defines a family of objects and has two kinds of members, namely, fields and methods. Fields are data variables associated with a class and its objects, and represent the object's state. Methods contain executable programming language statements, which define the object's behavior, and use the object's fields to manipulate its state. The way in which methods are invoked and the statements contained within those methods, is what ultimately directs program execution.

One of the major benefits of object-orientation is the ability to extend, or subclass, the behavior of an existing class. When you create a class that extends an existing one, the new class inherits all of the fields and methods of the extended class. The extended class is then said to be the superclass of the inheriting class. Unless the subclass overrides the superclass' methods, it inherits the behavior of the superclass. In Java, a class may only extend or have exactly one superclass.

Java further defines the notions of abstract classes and interfaces. An abstract class provides only a part of its implementation, leaving concrete classes extending it to provide specific implementation of some or all of the methods. To use an abstract class, a concrete class that extends the abstract class and provides the implementation for its abstract methods must be coded. Thereby the abstract class and the concrete class must be in the same inheritance tree.

An interface defines a set of methods that an object must support, but it does not supply the implementation to those methods. An interface is also commonly referred to as a type definition. To use an interface, a concrete class must be coded that implements the interface and provides the implementation for its abstract methods. In Java, a single concrete class may implement one or more interfaces, in effect providing a limited degree of multiple inheritance.

Java also defines the notion of serialized objects. A serialized object is an object in a Java application whose state has been captured into a series of bytes, which can be saved into an external file or transmitted across the network. A serialized object can be deserialized or awakened at a later time in the context of a different Java application, and can be processed or used as if it were any other normal object. This is a great facility that enables, among other things, object persistence and distributed object computing in Java.

In addition to the object-oriented programming language itself, Java also defines a virtual machine, the Java Virtual Machine, in which applications written in the Java programming language can be executed. Sun Microsystems and other computer companies provide an implementation of the Java Virtual Machine for a number of popular server and workstation operating systems and architectures. The Java Virtual Machine provides a uniform computing environment for Java applications. Any Java application that is correctly written can be executed in any proper implementation of the Java Virtual Machine, regardless of the underlying operating system or computer architecture. In this manner, Java applications achieve a high level of portability across different operating systems and computer architectures.

Figure 1A:
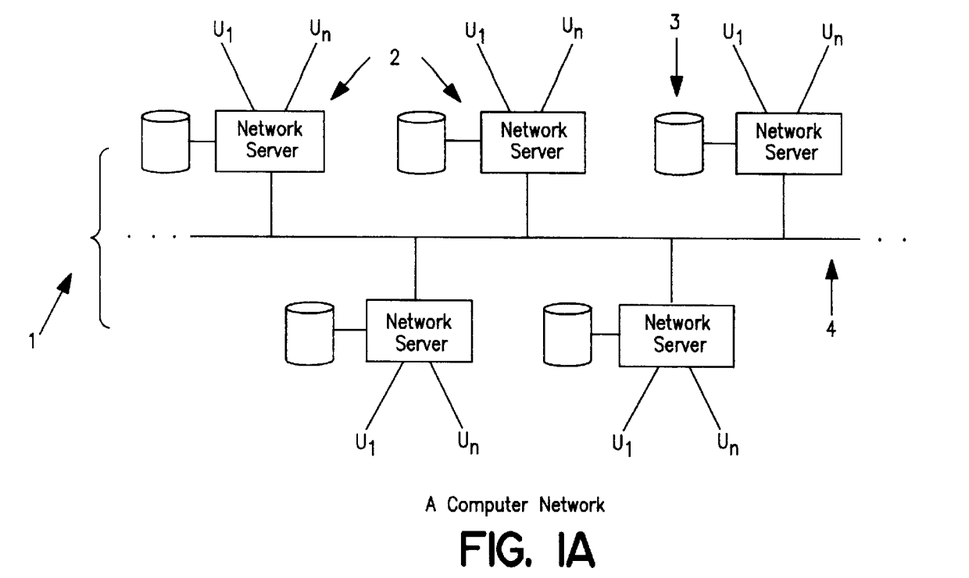
FIG. 1A is a prior art computer network incorporating the features of the Cashier Framework to provide the services necessary for conducting electronic commerce.

3. The Computer Network and the Network Server:

In FIG. 1A, a prior art computer network [1] includes a plurality of computer network servers [$2_1 \ldots 2_n$], each server coupled to a number of users [$U_1 \ldots U_n$] for, among other things, enabling communications and electronic commerce. Each computer network server [2] is a conventional computer that is equipped with server class hardware components, including a storage device [3] containing files and data which can be made available to the users. The servers are interconnected within a network [4], such as the Internet.

Figure 1B:
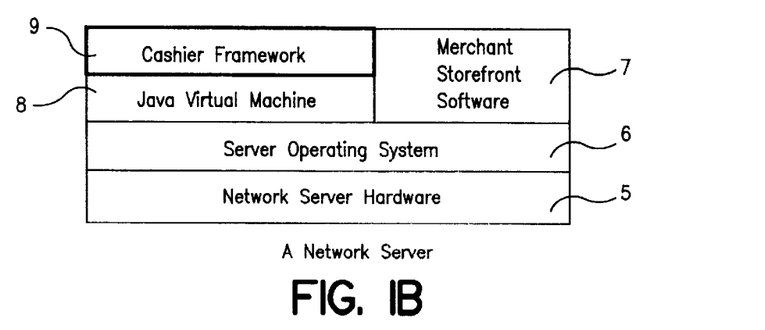
FIG. 1B is a block diagram showing the software layers atop the computer network server hardware of FIG. 1A, in which an instance of the Cashier Framework is employed to provide electronic commerce services.

A merchant operates one or more servers in the computer network [1] to provide the background services necessary for conducting electronic commerce. FIG. 1B shows the layers of software components that are run on a merchant's network server. A server operating system [6], such as IBM AIX (a variant of UNIX) or Microsoft Windows NT, runs above the network server hardware [5], which includes the communication, storage, and computation devices. This server operating system provides an environment in which applications, such as a World Wide Web merchant storefront software [7] (web server or web site), and an instance of a Cashier Framework [9], can be executed concurrently and continuously to provide the background services necessary for conducting electronic commerce. The operation of a web server or web site is described in the text "How the Internet Works" by J. Eddings (ZiffDavis Press, Emeryville, Calif., 1994). The operation of an instance of the Cashier Framework [9] requires the availability of a Java Virtual Machine [8] in the network server.

Figure 1C:
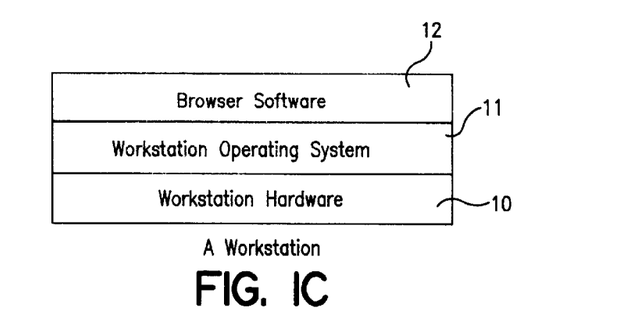
FIG. 1C is a block diagram showing the software layers atop the computer workstation hardware of FIG. 1A, which would be used by a typical computer user (customer) to connect to a computer network server, browse a merchant's storefront, or engage in a transaction with the merchant to purchase his products or services electronically.

In FIG. 1C, the layers of software components that are run atop a user's workstation [10]. Each computer network user [$U_1 \ldots U_n$] connects to the computer network [4] and requests services from the network server using the computer workstation [10] that is running a workstation operating system [11], such as IBM OS/2 Warp or Microsoft Windows 95, and a World Wide Web browser software [12], such as Netscape Navigator or Microsoft Internet Explorer.

Users [$U_1 \ldots U_n$] may request the services of one or more servers [$2_1 \ldots 2_n$] to initiate and complete an electronic commerce transaction. Before initiating an electronic commerce transaction, a user will browse a merchant storefront [7] on the World Wide Web where his products are being offered for sale. Using the browser software running on his workstation, the user will browse the merchant's storefront, select the desired products or services that are being offered for sale, and initiate a purchase request. The browser will send the purchase request to the merchant storefront software, which will forward it to the Cashier Framework [9] instance for payment collection. The Cashier Framework processes the request and returns the result of the payment collection, either approved or denied, to the merchant storefront software. Based on this result, the merchant storefront software will notify the user as to the status of the payment collection and will act on the fulfillment of the transaction accordingly.

4. The Cashier Framework and Its Components:

The Cashier Framework [9] is a product that simplifies the integration of back-end merchant software components used to conduct electronic commerce. The Cashier, and its related classes and interfaces, provides a framework in which multi-vendor back-end software components can be plugged in and utilized.

Figure 2:
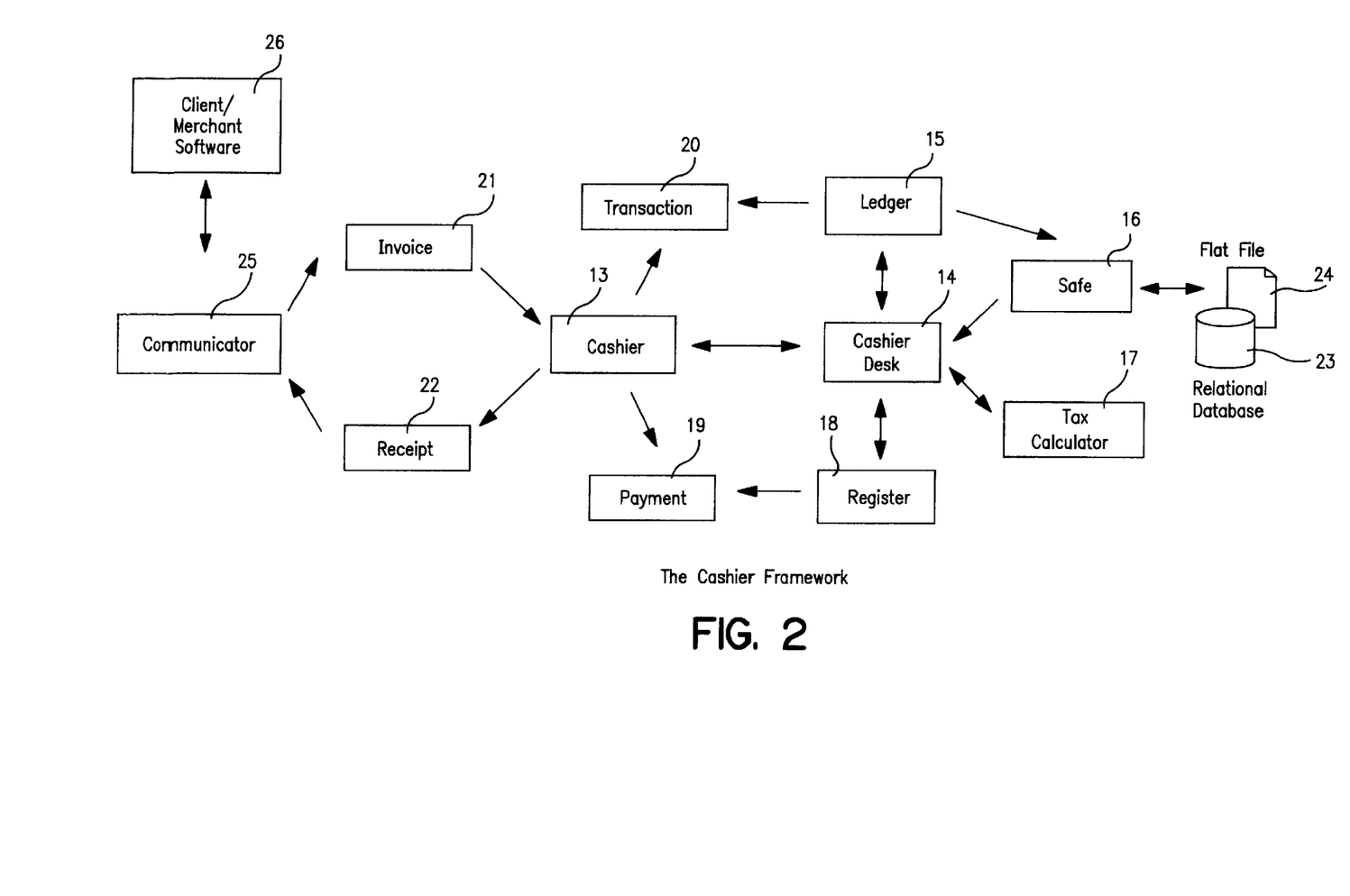
FIG. 2 is a block diagram showing the major components of the Cashier Framework, and how information is exchanged between these components. Each box in the diagram represents a class, abstract or concrete, or an interface whose implementation can be independently changed or replaced without affecting the operation of the remaining components.

FIG. 2 shows the major components of the Cashier Framework as boxes connected with arrow pointers. Each box in FIG. 2, with the exception of [26], labeled "Client/ Merchant Software", represents a class, an abstract class, or an interface, as defined in the Java programming language. A cashier abstract component [13] performs various functions in carrying out electronic commerce. Payment requests are assigned to a component CashierDesk [14], an abstract class containing the tools needed to handle a payment request or a transaction. The abstract class Cashier [13] interacts with an abstract class Invoice [21] for specifying the details of a payment request. An abstract class Transaction [20] transforms an Invoice into a Transaction for processing by the Cashier component [13]. An abstract class Payment [19] initiates payment for an approved Invoice. An abstract class Receipt [22] indicates a payment request has been authorized and captured.

The abstract class CashierDesk [14] provides tools necessary to handle a payment request or a transaction. An interface TaxCalculator [17] calculates sales taxes and other charges related to the payment transaction. An abstract class Register [18] captures a payment transaction processed by the CashierDesk [14]. An abstract class Journal [15] includes a Journal class [15] for temporarily storing a transaction processed by the CashierDesk [14]. An abstract class Safe [16] permanently stores the transaction processed by the abstract class Cashier [13].

An arrow indicates the flow of information or a relationship between connected components. Together, these components provide a framework that can be used with third party software components to implement back-end merchant services.

A Communicator component [25], provided as an interface, is responsible for listening to a communication port in the network server for incoming payment requests, sending those requests to the appropriate Cashier instance for processing, and sending the result of the processing to the originating requesters.

The Cashier component [13], provided as an abstract class, uses and coordinates other components to process payment requests and to record transactions. When a concrete subclass of a Cashier component is instantiated, it must be assigned an instance of the CashierDesk component [14], which is provided as an abstract class. An instance of a concrete class extending the CashierDesk always contains instances of the tools needed by the Cashier to handle a payment request or a transaction.

Using the CashierDesk component, the Cashier component can gain access to a number of tools necessary to process a payment request or a transaction. A TaxCalculator component [17] can be obtained to calculate sales tax and other charges related to the transaction. A Register component [18] can be obtained that can be used to capture payments in real time. A Journal component [15] can be obtained for temporarily storing the details of a transaction. A Safe component [16] can be obtained for permanently storing the details of a transaction. The following table shows the tools contained in a CashierDesk instance.

| CashierDesk Tool: | Description: |
| --- | --- |
| Journal | A means to record transactions temporarily. |
| Safe | A means to save a journal (and its transactions) permanently. |
| TaxCalculator | A means to calculate taxes applicable for a transaction. |
| Register | A means to capture the payment associated with a transaction. |

An Invoice object [21] is used to specify the detail of a payment request to the Cashier component. A client of the Cashier, such as the merchant storefront software, submits a payment request by transmitting the serialized form of an Invoice object to the Cashier component. The Invoice object contains various information, such as the items being purchased, the payment instrument used to provide payment, and merchant identification.

To process a payment request, the Cashier starts by transforming an Invoice object into a Transaction object [20], and further into a Payment object [19]. The Cashier uses the Invoice, Transaction, and Payment objects in conjunction with the tools provided by the CashierDesk to complete processing of the transaction. In the end, the Cashier indicates the success or failure of a payment request by sending a Receipt object [22] to the requesting client in the form of a serialized object.

5. Handling of an Electronic Commerce Transaction:

The operation of Cashier will now be described in handling payment request and completing a transaction entered into between a user and a merchant using the components that are available from the CashierDesk [14].

An electronic commerce transaction is typically initiated by a computer network user who is shopping at a merchant's web site. After selecting the items to be purchased, the user will indicate that he or she is ready to make the purchase by clicking on a button or selecting a hot link. This action triggers the merchant software [26] to summarize the purchase order and to collect payment information from the user.

The collection of payment information may be done in a number of ways. The merchant software may instruct the user to fill in a form that will specify how the merchant can collect payment from the user. This method normally requires the user to input the information to the form every time he or she makes a purchase. Alternatively, the merchant software may interact with an electronic wallet (e.g. See the above described U.S. Pat. No. 5,221,838 issued Jun. 22, 1993) that is running in the user's workstation to collect payment information. Since the payment information is retained by the electronic wallet, this method does not require the user to input payment information multiple times. The wallet simply retrieves the appropriate information from its database, and asks the user for permission to submit it to the merchant software.

It is certainly more efficient for the merchant's software to interact with an electronic wallet to collect payment information, since it will not require the user to enter payment information repeatedly. This, however, can be done only if the user owns, and has configured, an electronic wallet that can interact with the merchant's software correctly.

Once payment information is collected, the merchant software is ready to interact with the Cashier component [13], which will collect payment in real time. To do this, the merchant software will construct an Invoice object [21] containing the details of the transaction, including the items to be purchased, their individual prices, and the payment instrument that the user has provided to the merchant software. The merchant software will then submit this Invoice object to the Cashier component through a conventional Communicator component [25] linking the Cashier framework to the merchant software through the network 14.(SEE FIG. 1A).

The Communicator component is the component of the Cashier Framework that runs continuously to accept payment requests in the form of serialized Invoice objects. Merchant storefront software [26] submits an Invoice object in its serialized form through the computer network to the server port where the Communicator component is listening. The Communicator component knows how to forward a variety of Invoice objects to the appropriate Cashier component, which knows how to handle those Invoice objects. To understand this mechanism better, we need to examine how a particular instance of the Cashier Framework works.

The Cashier Framework may be used to process the sales of objects in a secure environment using a Cryptolope, described for example in Ser. No. 08/625,475, filed Mar. 29, 1996, assigned to the same assignee as that of the present invention and fully incorporated herein by reference. A Cryptolope object is a digital container (or "envelope") for a file(s) with the extension "jtz" that contains the encrypted form of a digital content. To use the contents of a Cryptolope object, a user must obtain a key to unlock the envelope, which can be acquired after the user submits the appropriate amount of payment to the merchant selling the contents. The following table lists the specific implementations of the Cashier Framework components in a Cryptolope Cashier.

| Cashier Framework Component: | IBM Cryotolope Cashier Implementation |
|---|---|
| Cashier | JtzBuycashier |
| Invoice | JtzInvoice |
| Receipt | JtzReceipt and CybercashReceipt |
| CashierDesk | IitCashierDesk |
| TaxCalculator | TaxwareTaxCalculator and DummyTaxCalculator |
| Register | CybercashRegister |
| Payment | CybercashPayment |
| Safe | FileSafe and JdbcSafe |
| Transaction | CreditCardTransaction |

In this particular instance of the Cashier Framework, the merchant software sends a JtzBuyInvoice object to a Communicator component causing it to forward the request to a JtzBuyCashier component. The associations between various Invoice objects and Cashier components within a specific instance of the Cashier Framework are known by the Communicator component. Using this mechanism, a merchant will be able to employ multiple Cashier components that can handle various types of electronic commerce transactions using a single instance of the Cashier Framework.

The Cashier component starts the processing of the payment request by creating a Transaction object [20], representing the request, in the Journal component [15]. A Journal component in the Cashier framework is used to record the state of a transaction temporarily. There is always one permanent store, which is provided by the Safe component [16] associated with a Journal component. The Cashier component gains access to a Journal component and the associated Safe component by requesting an instance of each from the CashierDesk component [14].

Depending on how the CashierDesk component is implemented, the Safe, in reality, may be associated to a relational database or to a regular file in the network server. The IitCashierDesk component in the Cryptolope Cashier implementation, as an example, provides the merchant with the option of using either a JdbcSafe or a FileSafe implementation. A JdbcSafe allows the merchant to use any relational database supporting the JDBC (Java Database Connectivity) application programming interface (API) as a Safe component. IBM DB2 Universal Database and Oracle 7.3 Database Server are examples of enterprise class relational databases supporting the JDBC API that can be used with the Cashier Framework. A FileSafe, on the other hand, allows the merchant to use a simple, flat or text file as a Safe component.

When the Cashier component creates a Transaction object in the Journal component, it marks the Transaction object with the status of 'PENDING' and stamps it with its creation time and date, and a serial number. The combination of the time stamp and the serial number can be used to uniquely identify a Transaction object in the Journal and Safe. The Cashier also records other, vital information about the payment request into the Transaction object. The merchant operating the Cashier may use this Transaction object to determine the status of a payment request and recover from a program failure when necessary.

The next step in the payment request processing involves sales tax calculation. To perform this calculation, the Cashier requests an instance of the TaxCalculator component [17] from the CashierDesk [14]. Using the Cryptolope Cashier implementation as an example, the IitCashierDesk can return to the Cashier either an instance of DummyTaxCalculator or TaxwareTaxCalculator class. A DummyTaxCalculator object always returns a zero amount of taxes for any transaction. This is useful for processing transactions in countries where sales tax is not applicable, such as Japan, or Indonesia. A TaxwareTaxCalculator uses the Sales/Use tax system from TAXWARE International to calculate appropriate sales taxes applicable for transactions made in the United States, Canada, and a number of European countries.

After sales tax calculation for a transaction is completed, the Cashier is now ready to use the Register component [18] to authorize and capture the payment. With the Cryptolope Cashier, the IitCashierDesk component will return a CybercashRegister object when asked for an instance of the Register component. A CybercashRegister connects to CashRegister software and CyberCash Payment Gateway from CyberCash, Inc. to authorize and capture credit card payments. More information about CyberCash CashRegister can be found in the World Wide Web at the address http://www.ccybercash.com/.

The CybercashRegister component indicates the success or failure of a payment authorization and capture by issuing a CybercashReceipt. The JtzBuyCashier object uses this CybercashReceipt to construct a JtzReceipt that it will send to the Communicator to be returned to the merchant software initiating the payment request. After sending the Receipt, the Cashier updates the Transaction in the Journal with the status 'COMPLETED' or 'DENIED' depending on the result of the authorization and capture step. To ensure that the Transaction is saved permanently, the Cashier saves the Journal to the Safe [16].

To complete the processing of the payment request, the Communicator sends the resulting Receipt object to the originating merchant software. The merchant software now uses the Receipt to complete the transaction by indicating to the user that the transaction has been denied (if the Register did not authorize the transaction), or by executing the fulfillment steps necessary to deliver the services or products that have been purchased to the user (if the Register authorized and captured the payment).

Figure 3:
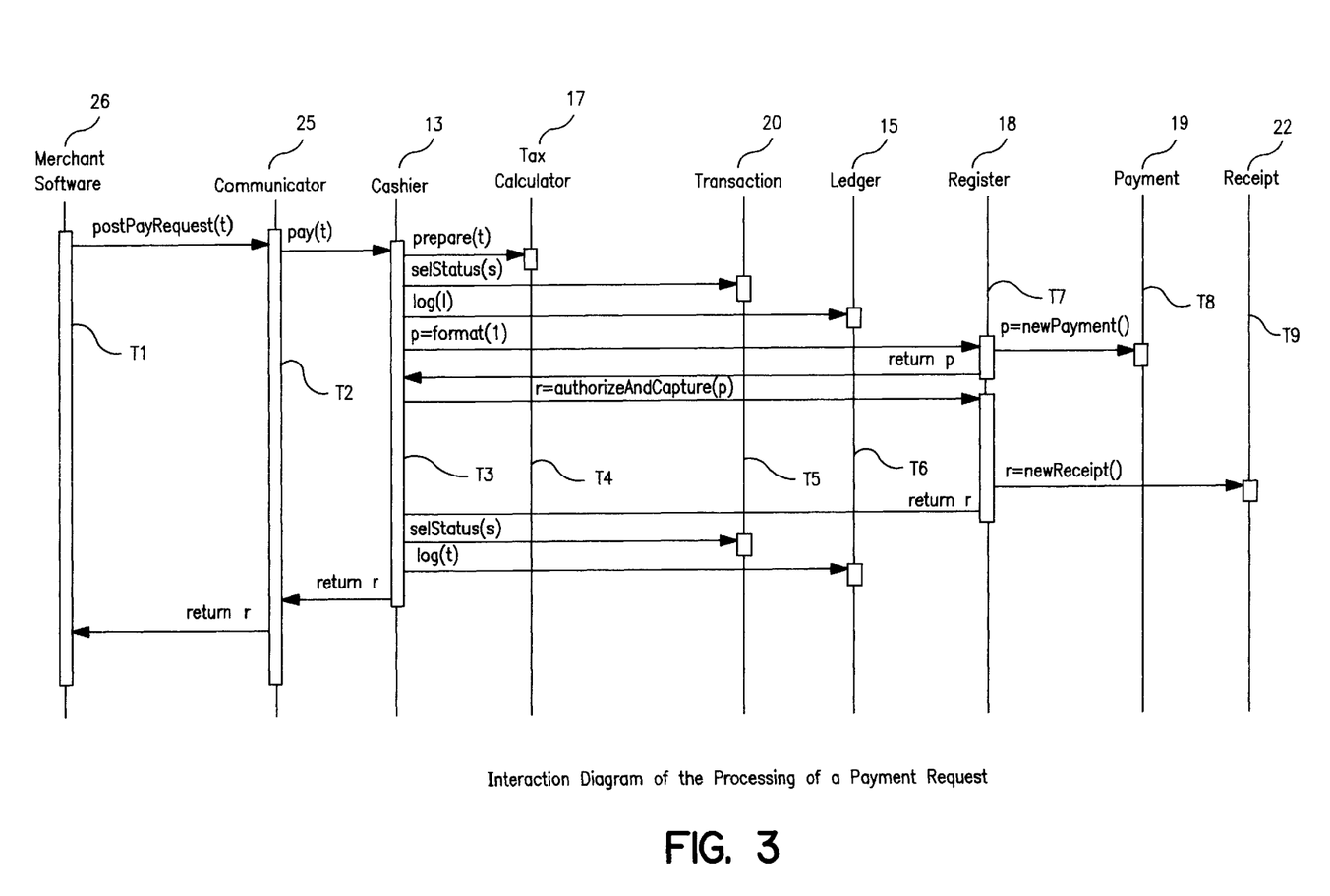
FIG. 3 is an interaction diagram showing the interaction between the software components in the Cashier Framework over time when processing a request for the collection of payment needed to complete the electronic purchase of a product or service.

The steps involved in handling a payment request are depicted in the interaction diagram of FIG. 3. Each vertical line in the figure represents a process that occurs in a software component as time progress indicated by a series of time lines [T1] . . . [T9]. The transfer of control between software components is indicated with an arrow, starting at the software component relinquishing the control to the software component acquiring the control. The arrow is further marked with the pseudonym of a method or operation that is invoked at the software component acquiring the control.

A transaction is initiated by an electronic wallet which causes the Merchant Software [26] to send a payment request to the Communicator [25]. This action is depicted in FIG. 3 by an arrow marked postPayRequest0 going from a time line [T1] for the Merchant Software to a time line [T2] for the Communicator [25]. The Communicator forwards the payment request to the Cashier component [13] at a time line [T3] by invoking its [pay]. The Cashier component calculates taxes by invoking the TaxCalculator [17] and invoking a [prepare] method at a time line [T4]. Once this is done the Cashier component updates the status of the Transaction component [20] at a time line [T5] by invoking a [setStatus] method. Next, the Cashier component logs the Transaction component to the a Journal component [15] at a time line [T6] by invoking a [log] method. The [log] method stores the state of the Transaction component [20] in the Journal component [15]. Next, the Cashier component submits the transaction to a Register component [18] to be formatted appropriately by invoking a [format] method. At a time line [T7], the Register component [18] formats the transaction by creating an instance of the Payment component [19] and returning the instance to the Cashier component at a time line [T8] by invoking a [return p] method. The Cashier component uses the Payment component [19] to submit the transaction to the Register component for authorization by invoking an [authorizeAndCapture] method of the Register component at the time line [T7]. The Register component processes the request appropriately, and in the end, creates a new instance of the Receipt component [22] to indicate the success or failure of the processing to the Cashier component by invoking a [new Receipt] method at a time line [T9] followed by invoking a [return] method to the Cashier component at the time line [T3]. Next, the Cashier component updates the status of the Transaction component by again calling the [setStatus] method. Once the status is updated at the time line [T5], the Cashier component updates the Journal component at the time line [T6] by invoking the [log] method. Next, the Cashier component finalizes the processing of the transaction by sending the Receipt component to the Communicator component at the time line [T2] by invoking a [return] method. Finally, the Communicator component sends the Receipt component to the Merchant Software at the time line [T1] by invoking the [return] method.

6. The Integration of Various Software Components:

Cashier, and its related classes and interfaces, provides a framework in which multi-vendor back-end solutions can be plugged in and utilized. Different cash registers, tax calculation software, or transaction databases could be used with the Cashier to provide integrated back-end payment services.

As an example, a Cryptolope Cashier uses the Cashier Framework to integrate tax calculation software from TAXWARE International, cash register software from CyberCash, and various enterprise class relational databases that are supporting the JDBC API.

The Cashier Framework simplifies the integration of custom or commercial electronic commerce software components by providing a set of generic classes that function as placeholders for real implementations of software components in its framework.

Various object-oriented programming techniques are applied to achieve a high degree of genericity in the classes that are included in the Cashier Framework. Consider, as an example, the creation of a specific instance of the Cashier. The following code segment requests the creation of an instance of a JtzBuyCashier object:

```
this._cashier = (JtzBuyCashier) Cashier.Instance(
    "COM.ibm.dbc.commerce.jtz",   // package name
    "JtzBuy",                      // operation name
    "JtzBuyCashier",               // cashier name
    new IitCashierDesk(),          // the desk
    new Secret(0, "")              // the secret
);
```

The code segment above invokes the method "Instance" in the abstract class Cashier, passing it the name "COM.ibm.dbc.commerce.jtz" as the name of the package where the concrete class JtzBuyCashier can be found, the name "JtzBuy" as the type of operation that JtzBuyCashier will handle, the name "JtzBuyCashier" as the name of a concrete Cashier subclass, a new instance of IitCashierDesk as the CashierDesk instance to be assigned to the JtzBuyCashier instance, and a new Secret object to identify the merchant to which this JtzBuyCashier belongs.

The invocation of the "Instance" method above causes the Java Virtual Machine running the Cashier to dynamically search the network server for a package with the name "COM.ibm.dbc.commerce.jtz" containing the class "JtzBuyCashier". Java packages are usually provided as an archive file in the JAR (Java Archive) format. A JAR file usually contains, among other things, a number of related Java packages and classes. In the case of the Cryptolope Cashier, the system is delivered in a single JAR file named "Cashier.jar". Once the package and the class is found, the Cashier uses the class JtzBuyCashier to dynamically create a new instance of it, and assign the IitCashierDesk object to this newly created instance.

The dynamic nature of the instantiation of the Cashier object, as well as other objects in the Cashier Framework, is one of the design features that gives the Cashier a high level of flexibility and extensibility. If, in the future, the operation of the JtzBuyCashier needs to be modified, the merchant will only need to provide the new JtzBuyCashier implementation in another JAR file. The Cashier will use the new implementation accordingly when asked to create an instance of the JtzBuyCashier. Assuming that the merchant had coded the new implementation of the JtzBuyCashier correctly, the operation of the Cryptolope Cashier will continue without disruption.

Most of the components of the Cashier Framework are provided as either an abstract class or an interface (a "type specification"). In this fashion, software components can be made to interoperate without having to provide their actual implementations in advance. An abstract class serves as a template for concrete classes and specifies how those concrete classes should behave. An interface specifies the methods, or services, that a concrete class must have in order to serve as the type defined by the interface. To illustrate the application of these concepts in the Cashier Framework, consider the abstract Cashier class.

A key element in the Cashier class is its abstract "pay( )" method. The method can be invoked to start the processing of a payment request. This method expects an instance of the Invoice class as a parameter that specifies the detail of the request. In return, the Cashier will generate an instance of the Receipt class to indicate the success or failure of the authorization and capture of the payment. A concrete class, such as JtzBuyCashier, that extends the abstract Cashier class must provide the body of the "pay( )" method. The "pay( )" method is declared in the abstract Cashier class as follows:

```
public abstract Receipt pay(Invoice invoice)
    throws Exception;
```

The Invoice parameter is specific to the operation that will be carried out by the Cashier. Different types of operations may require different types of information as input, and therefore needs different types of Invoice objects as parameters. The JtzBuyCashier class, in this case, expects the invoice to be an instance of the JtzInvoice class. Similarly, the Receipt is also specific to the Cashier operation. Following is the declaration of the concrete method "pay( )" in the concrete class JtzBuyCashier that extends the abstract class Cashier:

```
public Receipt pay(Invoice invoice)
    throws Exception { . . . };
```

In the code segment above, the ellipsis ( . . . ), indicates the body of the method where the code implementing the specific operation of the Cashier will be placed.

Any concrete class extending the abstract Cashier class must provide the body to the above "pay( )" method. Even though different types of Cashiers may carry out different types of operations, any other software components interacting with a Cashier object is guaranteed to be allowed to invoke a method named "pay( )" that will execute the processing of a payment request. This polymorphism is a powerful mechanism that is applied in many places in the Cashier Framework.

The CashierDesk is another abstract class that also functions as a "factory" that generates instances of other classes (tools) needed by the Cashier. By using a factory class, the Cashier is not hardwired to use specific instances of the tools. Consider the following code segment that shows how the Cashier obtains access to the instances of the tools:

```
TaxCalculator calculator =
    this.getDesk().getTaxCalculator ();
Register register =
    this.getDesk().getRegister();
Journal journal =
    this.getDesk().getJournal(0);
Safe safe =
    this.getDesk().getSafe() ;
```

In the above code segment, the Cashier obtains, for example, an instance of the TaxCalculator by going to its assigned CashierDesk, and then invokes the method "getTaxCalculator( )" of the CashierDesk. There are two abstractions that are important in this step and need to be highlighted.

First, the Cashier really does not know and does not care what kind of CashierDesk it has been assigned. Since any extension of the abstract CashierDesk class is guaranteed to have a method named "getTaxcalculator( )", it does not matter much to the Cashier which CashierDesk it is accessing.

Second, the Cashier further does not know and does not care what kind of TaxCalculator this CashierDesk is returning. All that the Cashier cares about is that an instance of a class implementing the TaxCalculator interface will be returned. Which one exactly, does not really matter to the Cashier. In the case of IBM Cryptolope Cashier, invoking the "getDesk( )" method will return an instance of the IitCashierDesk class, and invoking the "getTaxCalculator ( )" method will return either an instance of the DummyTaxCalculator or the TaxwareTaxCalculator class, depending on how the system has been set up.

Throughout the processing of a transaction, the Cashier uses abstract tools that work in a consistent manner, regardless of the implementation details of the tools. The Cashier can use a Register without knowing that the Register is a CybercashRegister, a Register that handles credit-card payment authorizations. As long as the Register works as a Register, the Cashier will be able to use it. Based on these abstractions, the operation of an implementation of the Cashier Framework can be altered dynamically by substituting, plugging in, and extending various software components into the framework.

The ability of the Cashier to work with abstract software components provides a flexible and extensible environment in which various back-end electronic commerce services that implement various electronic commerce technologies can be integrated to meet the specific needs of an electronic commerce merchant. For example, a merchant that is interested in using a different, possibly lower cost, or even home-grown, cash register software with the Cryptolope Cashier can replace the CybercashRegister that is initially included in the package without affecting the remaining operation of the IBM Cryptolope Cashier. The same mechanisms allow a merchant to extend existing components in the Cryptolope Cashier to add new operations or to incorporate new electronic commerce technologies.

In summary, the present invention is intended to be very flexible and extensible in anticipation of changes and advances in the electronic commerce area. The Cashier is modeled after a real life, human cashier, who performs the job well with the current set of tools and yet has the ability to learn to use new tools and new instruments as they become available. Being designed and implemented in an object-oriented and componentoriented fashion, the Cashier can achieve the goal of being a flexible and extensible electronic commerce system by providing a number of abstract and replaceable software components.

While the invention has been shown and described with respect to a preferred embodiment, various changes can be made in the scope thereof without departing from the spirit or scope of the invention as defined in the claims, which are as follows:

I claim:

1. In a computer network that includes a plurality of user workstations coupled to a network server containing a collection of replaceable and extensible object-oriented software components that interoperate to provide back-end services, a system for conducting electronic commerce between a user and an electronic commerce merchant, comprising:

a) means for initiating an implementation of an abstract, object-oriented Cashier component to process payment requests by employing a number of replaceable software components or tools;

b) means for generating an implementation of an abstract, object-oriented CashierDesk component that provides the Cashier component access to instances of other classes used in processing a transaction; and c) means for entering a transaction into the Cashier component for processing for payment and issuing of a receipt for the transaction using the CashierDesk components.

2. The system of claim 1 further comprising:

a) means for generating an implementation of an abstract interface Register, which defines a family of object-oriented software components that can be used to authorize and capture electronic payments.

3. The system of claim 1 further comprising:

a) means for generating an implementation of an abstract interface TaxCalculator, which defines a family of object-oriented software components that can be used to calculate sales tax and other charges related to a transaction.

4. The system of claim 1 further comprising:

a) means for generating a Journal component, which contains instances of the abstract Journal Item component, that can be used to store transactions temporarily.

5. The system of claim 1 further comprising:
a) means for generating an implementation of an abstract, object-oriented Safe component, which defines a family of object-oriented software components that can be used to store transactions permanently.

6. The system of claim 1 further comprising:
a) means for generating an implementation of an abstract Invoice component that can be used to specify the details of a payment request.

7. The system of claim 1 further comprising:
a) means for generating an implementation of an abstract Transaction component that can be used to record the status of an ongoing electronic commerce transaction.

8. The system of claim 1 further comprising:
a) means for generating an implementation of an abstract interface Payment, which defines a family of object-oriented software components that can be used to submit payments to a software cash register.

9. The system of claim 1 further comprising:
a) means for generating an implementation of an abstract Receipt component that can be used to indicate if a payment request has been authorized and captured.

10. The system of claim 1 further comprising:
a) means enabling each component to use the interfaces and abstract methods of other components such that varying the implementation of a component will not affect the operation of the remaining components in the system.

11. The system of claim 1 further comprising:
a) means for conducting the transactions in a secure environment.

12. The system of claim 1 wherein the Cashier component and its related classes and objects provides a framework in which multi-vendor functional components can be substituted in the framework for like functional components without affecting the operation of the system in conducting electronic commerce.

13. In a computer network that includes a plurality of user workstations coupled to a network server containing a collection of replaceable and extensible object-oriented software components that interoperate to provide back-end services, a method for conducting electronic commerce between a user and an electronic commerce merchant, comprising the steps of:
a) generating an implementation of an abstract, object-oriented Cashier Component to process payment requests by employing a number of replaceable software components or tools in a framework;
b) generating an implementation of an abstract, object-oriented CashierDesk component that provides the Cashier component access to instances of other classes used in processing a transaction; and
c) entering a transaction into the Cashier component for processing for payment and issuing of a receipt for the transaction using the CashierDesk components.

14. The method of claim 13 further comprising the step of:
a) providing an implementation of an abstract payment method in the Cashier abstract class by extending the Cashier class with a concrete implementation.

15. The method of claim 13 further comprising the steps of:
a) generating an abstract Invoice class; and
b) validating an Invoice object and ensuring that it is of an expected type.

16. The method of claim 15 further comprising the step of:
a) transforming the Invoice object into a Transaction object and saving the Transaction object temporarily in an instance of a Journal component.

17. The method of claim 13 further comprising the step of:
a) calculating taxes for the transaction using an instance of a TaxCalculator Component.

18. The method of claim 13 further comprising the step of:
a) creating a suitable Payment object representing the transaction and submitting the object to an instance of a Register component.

19. The method of claim 13 further comprising the step of:
a) creating an instance of a Receipt object returned by a Register component and transforming the instance into a suitable Receipt object for the transaction.

20. The method of claim 13 further comprising the step of:
a) determining the status of the transaction as 'PENDING', 'COMPLETED', or 'DENIED'.

21. The method of claim 13 further comprising the step of:
a) updating an instance of a Journal component with a new status of the transaction;
b) saving the Journal component into an instance of a Safe component, in effect saving all transactions permanently into the Safe component; and
c) returning an appropriate Receipt component to a component caller, whereby varying the implementation of a component will not affect the operation of the remaining system.

22. The method of claim 13 further comprising the step of:
a) using a digital container to conduct the transaction in a secure environment.

23. An article of manufacture comprising:
a computer readable program code embodied on a computer network for conducting electronic commerce between a user and an electronic commerce merchant in a system that includes a plurality of user workstations coupled to a network server containing a collection of replaceable and extensible object-oriented interface software components that interoperate to provide back-end services, the computer readable program code means in said article of manufacture comprising:
computer programming code which generates an implementation of an abstract, object-oriented Cashier Component to process payment requests by employing a number of replaceable software components or tools in a framework;
computer programming code generating an implementation of an abstract, object-oriented Cashier Desk component that provides the Cashier component access to instances of other classes used in processing a transaction; and
computer programming code entering a transaction into the Cashier component for processing for payment and issuing a receipt for the transaction using the CashierDesk components.

24. Computer programming code of claim 23 further comprising computer programming code for generating an implementation of an abstract interface Register, which defines a family of object-oriented software components that can be used to authorize and capture electronic payments.

25. Computer programming code of claim 23 further comprising computer programming code for generating an implementation of an abstract interface TaxCalculator which defines a family of object-oriented software components that can be used to calculate sales tax and other charges related to a transaction.

26. Computer programming code of claim 23 further comprising computer programming code for generating a Journal component, which contains instances of the abstract Journal item component, that can be used to store transactions temporarily.

27. Computer programming code of claim 23 further comprising computer programming code for generating an implementation of an abstract, object-oriented Safe component, which defines a family of object-oriented software components that can be used to store transactions permanently.

28. The computer programming code of claim 23 further comprising computer programming code for generating an implementation of an abstract Invoice component that can be used to specify the details of a payment request.

29. Computer programming code of claim 23 further comprising computer programming code for generating an implementation of an abstract transaction component that can be used to record the status of an ongoing electronic commerce transaction.

30. Computer programming code of claim 23 further comprising computer programming code for generating an implementation of an abstract interface Payment which defines a family of object-oriented software components that can be used to submit payments to a software CashRegister.

31. Computer programming code of claim 23 further comprising computer programming code for generating an implementation of an abstract Receipt component that can be used to indicate if a payment request has been authorized and captured.

32. Computer programming code of claim 23 further comprising computer programming code enabling each component to use the interface and abstract methods of other components such that during the implementation of a component will not affect the operation of the remaining components in the system.

33. Computer programming code of claim 23 further comprising the computer programming code for conducting transactions in a secure environment.

34. Computer programming code of claim 23 further comprising a computer programming code generating a Cashier component and its related classes and objects, the Cashier component providing a framework in which multi-vendor functional components can be substituted in the framework for like functional components without affecting the operation of the system in conducting electronic commerce.

* * * * *